Patented May 21, 1946

2,400,727

UNITED STATES PATENT OFFICE 2,400,727

PRODUCTION OF ALLYL-TYPE ESTERS

Harry L. Yale, Berkeley, Calif., assignor to Shell Development Company, San Francisco, Calif., a corporation of Delaware No Drawing. Application December 8, 1943, Serial No. 513,642

7 Claims. (Cl. 260—468)

This invention relates to a process for the production of unsaturated esters which comprises reacting hydrogen, in the presence of a hydrogenation catalyst, with the diester of an unsaturated aldehyde, which diester may be produced by reacting an unsaturated aldehyde with a carboxylic acid anhydride or a carboxylic acid halide.

More particularly this invention is concerned with a method for reacting the diester of an alpha,beta-unsaturated aldehyde with hydrogen to produce an allyl-type monoester according to the following general equation:

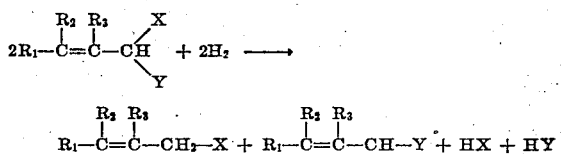

wherein X and Y may be the same or different and represent members of the group consisting of monovalent acid radicals such as Cl, Br, $HSO_4$, $OOCR_4$, $OOCR_5$, etc., $R_4$ and $R_5$ representing members of the group consisting of the hydrogen atom, hydrocarbon radicals, substituted hydrocarbon radicals, and heterocyclic radicals; and $R_1$, $R_2$ and $R_3$ may be the same or different and represent members of the group consisting of the hydrogen atom, hydrocarbon radicals, substituted hydrocarbon radicals, and heterocyclic radicals. The hydrocarbon radicals may be cyclic or acyclic, saturated or unsaturated, such as the alkyl, aryl, alkenyl, alkaryl, aralkyl, alkenaryl, aralkenyl, cycloalkanyl and cycloalkenyl radicals; the substituted hydrocarbon radicals include those hydrocarbon radicals which have been substituted by a halogen atom such as chlorine, bromine, or iodine, by a sulfur or nitrogen atom or by any suitable atom or radical which will not split off, or form a substance which is poisonous to the catalyst, or in any other way interfere with the desired reaction; and the heterocyclic radicals include those cyclic radicals whose ring members are composed of carbon atoms and one or more other atoms such as oxygen, sulfur, nitrogen, etc., for example, the furfuryl, thiophenyl, pyrrolyl, sulfolanyl, sulfolenyl radicals, and the like. It has been found convenient to have X and Y reprsent monovalent organic acid radicals of mono- or polycarboxylic acids, preferably monovalent organic acid radicals of monocarboxylic acids represented by $OOCR_4$; and $R_1$, $R_2$, $R_3$ and $R_4$ are preferably those substituents which are completely saturated, or are less susceptible to reaction with hydrogen than olefinic radicals, e. g. hydrogen and the alkyl, aryl, alkaryl, aralkyl, cycloalkyl, and heterocyclic radicals such as methyl, ethyl, propyl, isopropyl, butyl, hexyl, benzyl, phenyl, methylbenzyl, cyclohexyl, furfuryl, thiophenyl, sulfolanyl, and the like and their homologues. For example, acrolein diacetate may be hydrogenated according to the process of this invention to produce allyl acetate; methacrolein dibenzoate produces methallyl benzoate; crotonaldehyde diproprionate produces n-butenyl propionate; cinnamaldehyde diacetate produces cinnamic acetate; etc.

The term "allyl-type ester" as employed throughout the specification and in the appended claims is meant to include those esters having a mono-olefinic hydrocarbon radical of at least three carbon atoms in a straight chain attached to the monovalent acid radical by one of the carbon atoms which is joined by a single bond to the olefinic linkage. Since the allyl-type esters of this invention are those produced by the reaction of hydrogen with the diester of an unsaturated aldehyde, this particular group of allyl-type esters will have attached to the monovalent acid radical a hydrocarbon radical of the structural grouping

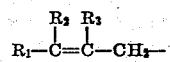

wherein $R_1$, $R_2$ and $R_3$, as stated above, may be the same or different and represent members of the group consisting of the hydrogen atom and hydrocarbon radicals.

The specific diester chosen to be reacted with hydrogen according to the process of this invention would depend upon the product or products desired, and may be prepared in any suitable manner such as by the reaction of an alpha,beta-unsaturated aldehyde, chloral or bromal with a carboxylic acid anhydride, or by reaction of a metal salt, such as a silver, lead, or sodium salt, of a carboxylic acid, with an alkylidene halide. A method, which has been found particularly effective for the formation of the diester, comprises reacting an alpha,beta-unsaturated aldehyde with a carboxylic acid anhydride or a carboxylic acid halide, if desired in the presence of a catalyst selected from a group including a suitable acid such as sulfuric acid, oxalic acid, etc., and metal halides such as stannous chloride, ferric chloride, stannic chloride, etc. The reaction may be effected in the presence of a suitable inert solvent, if desired. It has been found especially convenient to use a metal halide catalyst, for example stannous chloride, to enable the reaction to be carried out at a low temperature to decrease the possibility of formation of polymeric by-products formed at high temperatures. The temperature is maintained below atmospheric temperature, preferably at about 0° C. to about 20° C. The formation of the diester by this process may be represented by the following general equation:

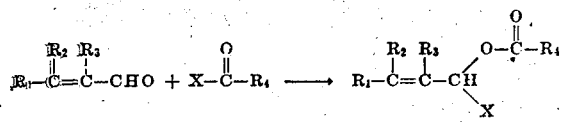

wherein X is a monovalent acid radical such as Cl, Br, OOCR₅, etc., R₅ representing a hydrogen atom, a hydrocarbon radical, a substituted hydrocarbon radical or a heterocyclic radical; and R₁, R₂, R₃ and R₄ are members of the group consisting of the hydrogen atom, hydrocarbon radicals, substituted hydrocarbon radicals and heterocyclic radicals. When the alpha, beta-unsaturated aldehyde is reacted with a carboxylic anhydride of the formula

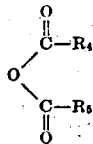

it is to be understood that R₄ and R₅ may be linked together to form a divalent radical which is cyclic or acyclic, i. e. the compound may be the anhydride of a mono- or polycarboxylic acid which may be cyclic or acyclic. Suitable carboxylic acid anhydrides and carboxylic acid halides include acetic acid anhydride, propionic acid anhydride, butyric acid anhydride, benzoic acid anhydride, oxalic acid anhydride, phthalic acid anhydride, the dihydrophthalic acid anhydrides, the tetrahydrophthalic acid anhydrides, and the mixed anhydrides such as formic-acetic acid anhydride, acetic-propionic acid anhydride, acetyl chloride, propionyl bromide, and the like and their homologues. Suitable unsaturated aldehydes include such compounds as acrolein, methacrolein, crotonaldehyde, tiglaldehyde, alpha-methyl-beta-ethylacrolein, citral, cinnamaldehyde, and the like and their homologues.

For example, according to the process of this invention, allyl acetate may be prepared by condensing acrolein with acetic anhydride, and reacting the resultant acrolein diacetate with hydrogen; methallyl acetate may be prepared by reacting methacrolein with acetic anhydride, and reacting the resultant methacrolein diacetate with hydrogen; beta-methyl-gamma-ethylallyl propionate may be produced by condensing alpha-methyl-beta-ethylacrolein with propionic acid anhydride and reacting the resulting alpha-methyl-beta-ethyl-acrolein dipropionate with hydrogen; etc.

The reaction with hydrogen is effected in the presence of a hydrogenation catalyst of sufficient activity to promote the desired reaction at a practical rate under conditions of temperature, pressure and contact time which are not conducive to effecting undesirable side reactions. The suitable catalyst selected for any given reaction will depend upon the specific activity of the catalyst, the activity of the specific diester to be reacted, and upon the stability of the catalyst against decomposition or inactivation at the temperature and pressure at which subtantially complete reaction can occur at a practical rate.

A suitable catalyst may be any member or combination of members of the group of materials known as "hydrogenation catalysts." Catalysts selected from the group consisting of the oxides or sulfides of the metals, particularly the oxides or sulfides of nickel, tungsten, molybdenum, cerium, thorium, chromium and zirconium or mixtures comprising two or more metal oxides and/or sulfides, or one or more metal oxides with one or more metals, may be employed. Compound catalysts comprising two or more metals in admixture or alloyed as, for example, silver-copper, copper-chromium, copper-zinc, nickel-cobalt, nickel-zinc, etc. have been found useful.

Excellent results may be obtained by using suitable metal catalysts which are reasonably inexpensive and easy to prepare and regenerate. For example, base metal catalysts such as copper, chromium, thallium, nickel, iron, cobalt and the like are particularly effective when employed in a finely divided state or deposited on a suitable carrier. Pyrophoric nickel, iron and cobalt are especially suitable for use in effecting the process of this invention, for they possess the proper initial activity for rapid hydrogenation at relatively low temperatures and pressures, are easily prepared and regenerated, and retain their activity over relatively long periods of time. Particularly fine results have been noted with the use of a finely divided pyrophoric metal catalyst such as Raney nickel catalyst. These catalysts may be used singly or in combination, and may, if desired, be deposited upon an inert substance or carrier such as pumice, silica gel, kieselguhr, charcoal, calcium carbonate, and the like. The activity of the catalyst may also be enhanced by the incorporation of promoters, which include such substances as high melting and difficultly reducible oxygen-containing compounds, in particular, the oxides and oxygen-containing salts of elements such as the alkaline earth and rare earth metals, beryllium, magnesium, aluminum, copper, thorium, manganese, uranium, vanadium, chromium, boron, zinc, etc. A particularly suitable group of promoters includes the difficultly soluble phosphates, molybdates, tungstates and selenates of the above-listed metals, or their oxygen-containing reduction products, as, for example, the corresponding selenites.

Although the base metal catalysts are most suitable, it is to be understood that the noble metals of the requisite activity selected from the group comprising gold, silver, platinum, palladium, osmium, rhodium, iridium and the like, may also be used, severally or in combination, or in admixture with one or more of the base metals.

These catalysts may be prepared by any suitable method. A pyrophoric nickel catalyst of great activity may be prepared by effecting the reduction or thermal decomposition of nickel salts of volatile organic acids. For example, a pyrophoric nickel catalyst particularly suitable in the execution of this invention may be prepared by effecting the reduction or decomposition of nickelous formate. The nickelous formate may be reduced to pyrophoric nickel metal by heating it to a temperature of from about 200° C. to 350° C. in an atmosphere of hydrogen, or the nickelous formate may be dissolved or suspended in a suitable inert liquid such as a petroleum oil, hydrocarbon and the like and the mixture heated to the decomposition temperature of the nickelous formate in the presence or absence of hydrogen or other suitable reducing gases.

The amount of the catalyst to be used will depend to some extent upon the particular compound to be reacted with hydrogen and upon the activity of the specific catalyst selected. When Raney nickel is used, the catalyst is generally present in an amount equal to about 1% to about 20% by weight of the organic reactants in the reaction mixture. However, considerable variation in this proportion may be made.

It has been found that in some cases the same charge of catalyst may be used repeatedly without reactivation. In fact, repeated use of a charge of catalyst appears to serve a beneficial action by increasing the percentage yield of the allyl-type ester. For example, when a charge of methacrolein diacetate was reacted with hydrogen at about 175° C. over a charge of freshly prepared Raney nickel catalyst, a yield of methallyl acetate of about 20 per cent based on the diacetate charged was obtained; and when five additional charges of methacrolein diacetate had been reacted with hydrogen over the same initial charge of catalyst, there was found no appreciable deactivation of the catalyst, and the yield of methallyl acetate had been increased to about 50% with a corresponding decrease in the yield of saturated isobutyraldehyde diacetate by-product.

The temperature at which the process may be effectively executed depends upon the activity of the specific catalyst chosen, upon the nature of the reactants and the stability of the products, upon the contact time and upon the effective pressure of hydrogen in the system. Generally, temperatures above about 50° C. but below about 400° C. are suitable to effect the reaction of the diester with hydrogen. In most cases, temperatures between about 150° C. and 300° C. are effective, but lower or higher temperatures may be employed, if desirable.

The organic reactant may be in the vapor or liquid phase, and the reaction may be carried out at an elevated, reduced or atmospheric pressure, although superatmospheric pressures above about 25 pounds per square inch are preferred. In general, pressures between about 50 pounds per square inch and about 3000 pounds per square inch are sufficient. In the case of the reaction of hydrogen with the di-carboxylic acid esters of alpha,beta-unsaturated aldehydes, pressures of the order of about 500 pounds per square inch to about 2000 pounds per square inch have been found effective.

In view of the fact that the hydrogen present during the reaction may also react with the unsaturated esters present to form saturated esters, it is in most cases preferable not to use a substantial excess of hydrogen, but to stop the reaction when approximately the calculated amount of hydrogen necessary to bring about the desired reaction has been absorbed. Generally, an amount of hydrogen slightly in excess of the calculated required amount is found effective, but in some cases greater or lesser amounts may be employed, if desirable.

The process may be effected in an intermittent, batchwise or continuous manner, and any suitable type apparatus may be used. One simple and convenient type is a steel vessel, preferably equipped with means for agitating its contents as by mechanical stirring, and having means whereby the contents may be heated and cooled. For example, the reactants may be introduced into a stirred steel autoclave which is heated in an oil bath to the desired temperature at the desired pressure.

If desired, the condensation and/or reaction with hydrogen may be carried out in the presence of any inert organic solvent which is non-reactive to the reactants and reaction products under the conditions of the reaction. Suitable solvents include the ethers and hydrocarbon mixtures or hydrocarbons such as benzene, toluene, etc. The specific substance selected may be a solvent for the reactants and/or the reaction products, and should be present in effective amounts, e. g. at least enough to bring about solution of portions of the reactants, but not enough to decrease materially the concentration of the reactants or in any other way to decrease the efficiency of the reaction.

The following examples are described for the purpose of making the invention clear, and are not to be regarded as a limitation to the process of this invention.

*Example I*

Acrolein was reacted with acetic anhydride in the presence of stannous chloride to produce acrolein diacetate in about 65% conversion, based on the acrolein applied.

About 3.4 moles of the acrolein diacetate were reacted with hydrogen over Raney nickel catalyst at about 200 C. to about 235° C. and under a pressure of about 1000 pounds per square inch of hydrogen. Hydrogen was absorbed smoothly, and after approximately two hours, about 3.88 moles had been absorbed. The reaction products were filtered and distilled to give a combined yield of about 60 per cent, based on the diacetate charged, of a mixture of allyl acetate and n-propyl acetate.

*Example II*

About 420 parts by weight of methacrolein were added to a stirred solution of about 1.5 parts by weight of stannous chloride in approximately 735 parts by weight of acetic anhydride, and the temperature was maintained at about 0° C. to about 10° C. A yield of about 7 per cent of methacrolein diacetate, based on the methacrolein charged, was produced.

About 580 parts by weight of the methacrolein diacetate were reacted with hydrogen over Raney nickel catalyst at about 175° C. and at a pressure of about 1000 pounds per square inch of hydrogen. When about 6.5 parts by weight of hydrogen had been absorbed, the reaction products were distilled to give a yield of methallyl acetate of about 50 per cent based on the diacetate charged.

I claim as my invention:

1. A process for the production of beta,gamma-dimethyl allyl benzoate which comprises reacting tiglaldehyde dibenzoate with hydrogen in the presence of Raney nickel catalyst at a temperature between about 175° C. and about 235° C. at a pressure of about 1000 pounds per square inch of hydrogen.

2. A process for the production of allyl acetate which comprises reacting acrolein diacetate with hydrogen in the presence of Raney nickel catalyst at a temperature of about 175° C. and at a pressure of about 1000 pounds per square inch of hydrogen.

3. A process for the production of methallyl acetate which comprises reacting methacrolein diacetate with hydrogen in the presence of Raney nickel at a temperature of about 200° C. to about 235° C. and at a pressure of about 1000 pounds per square inch of hydrogen.

4. A process for the production of allyl acetate which comprises reacting acrolein diacetate with hydrogen in the presence of a pyrophoric base metal catalyst at a temperature of about 150° C. to about 300° C. and at a pressure of about 500 pounds per square inch to about 2000 pounds per square inch.

5. A process for the production of methallyl acetate which comprises reacting methacrolein diacetate with hydrogen in the presence of a pyrophoric base metal catalyst at a temperature of about 150° C. to about 300° C. and at a pressure of about 500 pounds per square inch to about 2000 pounds per square inch.

6. A process for the production of an allyl-type monoester of a saturated carboxylic acid which comprises reacting the saturated carboxylic acid diester of an alpha,beta-unsaturated aldehyde with hydrogen in the presence of a pyrophoric base metal catalyst at a temperature of about 150° C. to about 300° C. and at a pressure of about 500 pounds per square inch to about 2000 pounds per square inch.

7. A process for the production of an allyl-type ester which comprises reacting a diester of an alpha,beta-unsaturated aldehyde with hydrogen in the presence of a hydrogenation catalyst at a temperature of about 150° C. to about 300° C. and at a pressure of about 500 pounds per square inch to about 2000 pounds per square inch.

HARRY L. YALE.